(12) United States Patent
Phillips et al.

(10) Patent No.: US 10,535,466 B1
(45) Date of Patent: Jan. 14, 2020

(54) SUPER DIELECTRIC CAPACITOR HAVING ELECTRICALLY AND IONICALLY CONDUCTING ELECTRODES

(71) Applicant: The United States of America, as represented by the Secretary of the Navy, Washington, DC (US)

(72) Inventors: Jonathon Phillips, Pacific Grove, CA (US); Samuel Salvadore Fromille, IV, Kapolei, HI (US); Claudia C. Luhrs, Pacific Grove, CA (US)

(73) Assignee: United States of America as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 15/827,050

(22) Filed: Nov. 30, 2017

Related U.S. Application Data

(63) Continuation-in-part of application No. 15/239,039, filed on Aug. 17, 2016, now Pat. No. 10,020,125, (Continued)

(51) Int. Cl.
*H01G 4/22* (2006.01)
*H02J 7/00* (2006.01)
(Continued)

(52) U.S. Cl.
CPC .............. *H01G 4/221* (2013.01); *H01G 4/005* (2013.01); *H02J 7/0063* (2013.01); *H02J 7/345* (2013.01)

(58) Field of Classification Search
CPC ........ H01G 11/56; H01G 11/22; H01G 11/62; H01G 11/86; H01G 4/005; H01G 4/221;
(Continued)

(56) References Cited

U.S. PATENT DOCUMENTS

| 3,138,746 A | 6/1964 | Burger et al. |
| 3,547,423 A | 12/1970 | Jenny et al. |

(Continued)

OTHER PUBLICATIONS

Wakai,"How Polar Are Ionic Liquids? Determination of the Static Dielectric Constant of an Imidazolium-based Ionic Liquid by Microwave Dielectric Spectroscopy," J. Phys. Chem. B, vol. 109, No. 36 (2005).

(Continued)

*Primary Examiner* — Michael P McFadden
(74) *Attorney, Agent, or Firm* — Naval Postgraduate School; Scott Bell

(57) ABSTRACT

A capacitor comprising a first electrode and a second electrode where at least the first electrode comprises a ionically conductive material typically having both an electrical and ionic conductivity, such as an oxide. The capacitor further comprises a dielectric material contacting the first and second electrode and comprising a porous material having a surface area greater than 0.5 $m^2$ of surface/gm of material, and further comprising a liquid containing ions within the pores of the porous material. In certain embodiments, the capacitor additionally comprises a first current collector in contact with the first electrode and a second current collector is contact with the second electrode, where the first and second current collector comprise an electrically conductive material.

20 Claims, 2 Drawing Sheets

Related U.S. Application Data which is a continuation-in-part of application No. 14/624,321, filed on Feb. 17, 2015, now Pat. No. 9,530,574.

(60) Provisional application No. 62/075,309, filed on Nov. 5, 2014.

(51) Int. Cl.
    *H01G 4/005*     (2006.01)
    *H02J 7/34*     (2006.01)

(58) Field of Classification Search
CPC ... H02J 7/0063; H02J 7/345; H02J 2007/0067
USPC .......................................................... 361/502
See application file for complete search history.

(56) References Cited

U.S. PATENT DOCUMENTS

| | | | |
|---|---|---|---|
| 3,700,975 A | 10/1972 | Butherus et al. | |
| 6,454,816 B1 | 9/2002 | Lee et al. | |
| 2011/0164349 A1* | 7/2011 | Snyder | H01G 11/02 361/525 |
| 2011/0297420 A1* | 12/2011 | Gibson | H01G 11/02 174/126.1 |
| 2011/0304953 A1 | 12/2011 | Zhou et al. | |
| 2013/0335885 A1* | 12/2013 | Ginatulin | H01G 11/36 361/511 |
| 2014/0233152 A1* | 8/2014 | Gardner | H01G 11/30 361/305 |
| 2015/0072267 A1* | 3/2015 | Suss | H01M 8/18 429/499 |

OTHER PUBLICATIONS

Sato et al., "Electrochemical properties of novel ionic liquids for electric double layer capacitor applications," Electrochimica Acta 49 (2004).
Lu et al.,"High performance electrochemical capacitors from aligned carbon nanotube electrodes and ionic liquid electrolytes," Journal of Power Sources 189 (2009).
Younesi et al., "Lithium salts for advanced lithium batteries: Li—metal, Li-O2, and Li—S," Energy Environ. Sci.8 (2015).
Bo et al., "Molecular Insights into Aqueous NaCl Electrolytes Confined within Vertically-oriented Graphenes," Sci. Rep. 5 (2015).
Kotz et al,"Principles and applications of electrochemical capacitors," Electrochimica Acta 45 (2000).
Akinwolemiwa et al., "Redox Electrolytes in Supercapacitors," Journal of the Electrochemical Society, 162 (5) (2015).
Conway et al.,"Transition from "Supercapacitor" to "Battery" Behavior in Electrochemical Energy Storage," J. Electrochem. Soc. 138(6) (1991).
Liu et al., "Understanding electrochemical potentials of cathode materials in rechargeable batteries," Materials Today 19(2) (2016).
Chen,"Understanding supercapacitors based on nano-hybrid materials with interfacial conjugation," Progress in Natural Science: Materials International 23(3) (2013).
Cherif et al.,"Conductivity study by complex impedance spectroscopy of Na3Nb4As3O19," available at https://www.sciencedirect.com/science/article/pii/S1878535215002877 last accessed Nov. 30, 2017 (2015).
Wang et al,"Electrical and Ionic Conductivity of Gd-Doped Ceria," Journal of the Electrochemical Society, 147 (10) (2000).
Wang et al., "Electrochemical Impedance Spectroscopy (EIS) Study of LiNi1/3Co1/3Mn1/3O2 for Li-ion Batteries," Int. J. Electrochem. Sci., 7 (2012).
Zheng et al., "Hydrous Ruthenium Oxide as an Electrode Material for Electrochemical Capacitors," J.Electrochem. Soc., 142(8) (1995).
Simon et al., "Materials for electrochemical capacitors," nature materials, 7 (2008).
Riess, "Mixed ionic-electronic conductors—material properties and applications," Solid State Ionics 157 (2003).
Aggarwal et al., "Oxide electrodes as barriers to hydrogen damage of Pb(Zr,Ti)-O3-based ferroelectric capacitors," Applied Physics Letters, 74(20) (1999).
Shetzline et al.,"Quantifying Electronic and Ionic Conductivity Contributions in Carbon/Polyelectrolyte Composite Thin Films," Journal of the Electrochemical Society, 161 (14) (2014).
Shekhar et al., "Studying the Impact of Metal Oxide in the Development of Hybrid Capacitor," IEEE Sponsored Second International Conference on Electronics and Communication Systems(ICECS 2015).
Gandy et al.,"Testing the Tube Super-Dielectric Material Hypothesis:Increased Energy Density Using NaCl," Journal of Electronic Materials, 45(11) (2016).
Cortes et al.,"Tube-Super Dielectric Materials: Electrostatic Capacitors with Energy Density Greater than 200 J cm-3," Materials, 8 (2015).
Fromille et al., "Super Dielectric Materials," Materials, 7 (2014).
Phillips,"Novel Superdielectric Materials: Aqueous Salt Solution Saturated Fabric," Materials, 9 (2016).
Jenkins et al., "Investigation of Fumed Silica/Aqueous NaCl Superdielectric Material," Materials 9 (2016).
Jenkins, "Optimal super dielectric material," MS Thesis, Naval Postgraduate School, Monterey, CA, Sep. 2015, available at https://calhoun.nps.edu/handle/10945/47280 last accessed Nov. 30, 2017.
Petty,"Powder-based superdielectric materials for novel capacitor design," MS Thesis, Naval Postgraduate School, Monterey, CA, Jun. 2017, available at https://calhoun.nps.edu/handle/10945/55518 last accessed Nov. 30, 2017.
Fromille, "Novel Concept for High Dielectric Constant Composite Electrolyte Dielectrics," MS Thesis, Naval Postgraduate School, Monterey, CA, Sep. 2013, available at https://calhoun.nps.edu/handle/10945/53408 last accessed Nov. 30, 2017.

* cited by examiner

SUPER DIELECTRIC CAPACITOR HAVING ELECTRICALLY AND IONICALLY CONDUCTING ELECTRODES

RELATION TO OTHER APPLICATIONS

This application claims priority to and the benefit of U.S. application Ser. No. 15/239,039 filed Aug. 17, 2016, which claimed priority to and the benefit of U.S. application Ser. No. 14/624,321 now U.S. Pat. No. 9,530,574 filed Feb. 17, 2015, which claimed priority to and the benefit of U.S. Application 62/075,309 filed Nov. 5, 2014, all of which are hereby incorporated in its entirety by reference.

FIELD OF THE INVENTION

The present invention is directed to a capacitor using a particular dielectric materials having high dielectric constants.

BACKGROUND

There are several distinct capacitor technologies, such as super capacitors and traditional electrostatic, also known as 'dielectric', capacitors. Super capacitors increase capacitance by increasing the surface area of the electrically conductive electrode. Most of the volume of a super capacitor is the high surface area electrode, which is basically in powder form. Increasing the super capacitor 'depth' while keeping constant the shape/surface area of the attaching ends, increases the amount of electrode material area and increases the capacitance. Consistent with this paradigm is the recent interest in employing graphene in super capacitors, as graphene is very good for that purpose. Indeed, graphene has very high electrical conductivity and the measured surface of some graphene forms are near the theoretical limit (2700 $m^2$/gm). Given that the electrode surface area of graphene in super capacitors is near its theoretical limit, further dramatic energy density increases in these devices is unlikely.

In contrast to the improvements made with super capacitors, there has only been a marginal advance in the last few decades in finding materials with superior dielectric constants for the traditional electrostatic capacitor that is a capacitor built of a single dielectric material with a high dielectric constant sandwiched between two flat conductive electrodes. One clear functional contrast between super capacitors and electrostatic capacitors is the impact of 'depth' or 'thickness'. In an electrostatic capacitor, capacitance increases inversely to the distance between plates. Thus, given plates of a constant size, the thinner an electrostatic capacitor, the greater the capacitance. Therefore in order to improve the performance of this style of capacitor they either have to be made thinner and/or use materials with higher and higher dielectric constants.

SUMMARY

In accordance with one embodiment of the disclosure a capacitor includes a first electrode and a second electrode where the first electrode and the second electrode comprise a ionically conductive material typically having both an electrical and ionic conductivity, such as an oxide, and further includes a dielectric material contacting the first and second electrode, where the dielectric material has a dielectric constant greater than $10^5$ and where the dielectric material comprises a porous material having a surface area greater than 0.5 $m^2$ of surface/gm of material and further comprises a liquid containing ions within the pores of the porous material. In certain embodiments, the capacitor additionally comprises a first current collector in contact with the first electrode and a second current collector is contact with the second electrode, where the first and second current collector comprise an electrically conductive material.

A further embodiment of the disclosure includes a method for forming a capacitor using a dielectric material with a dielectric constant greater than $10^5$, comprising forming a dielectric material paste by mixing a porous material having a surface area greater than 0.5 $m^2$ of surface/gm of material with a liquid containing ions, applying the dielectric material paste to a first electrode and establishing contact between the dielectric material paste and the first electrode, and placing a second electrode on the dielectric material paste at a location such that the dielectric material paste separates the first electrode and the second electrode.

A further embodiment of the disclosure includes a method of supplying power using the capacitor, comprising applying a first voltage to the first electrode and a second voltage to the second electrode, where a difference between the second voltage and the first voltage is less than a breakdown voltage of the liquid comprising ions within the pores of the porous material of the dielectric material, thereby generating a charged capacitor, and electrically connecting the charged capacitor to the load and discharging the charged capacitor to the load, thereby supplying power to the load.

DETAILED DESCRIPTION

Figure 1:
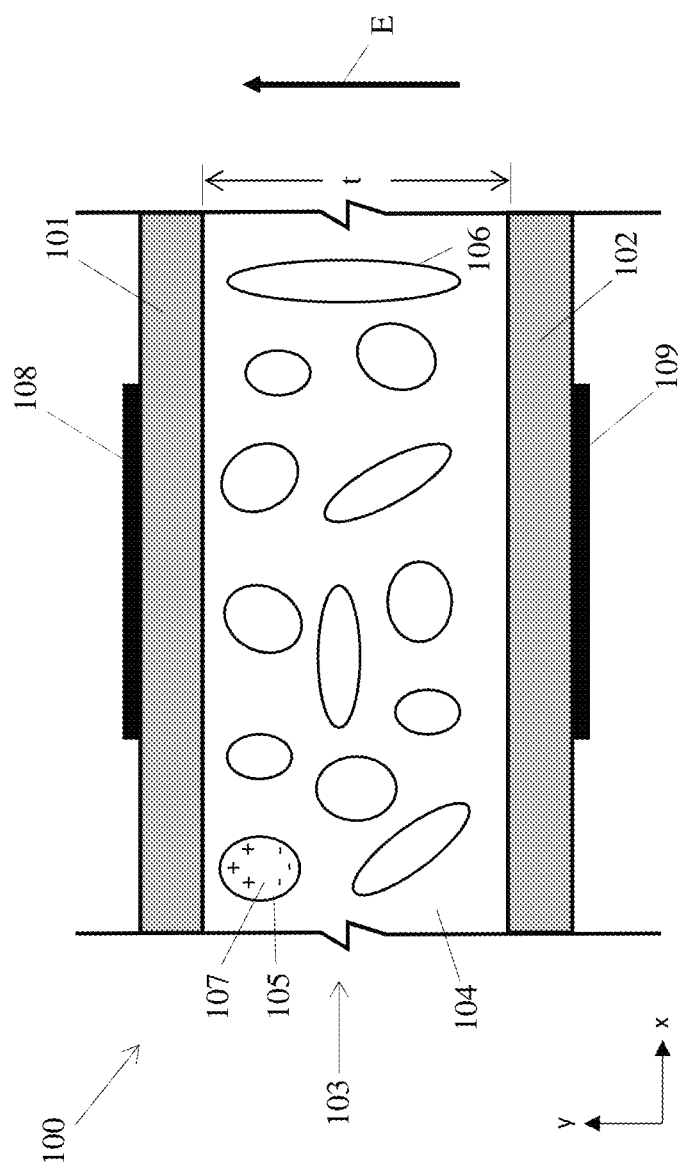
FIG. 1 illustrates an embodiment of the capacitor and dielectric disclosed.

For illustrative purposes, the principles of the present disclosure are described by referencing various exemplary embodiments. Although certain embodiments are specifically described herein, one of ordinary skill in the art will readily recognize that the same principles are applicable to, and can be employed in other systems and methods.

Before explaining the disclosed embodiments of the present disclosure in detail, it is to be understood that the disclosure is not limited in its application to the details of any particular embodiment shown. Additionally, the terminology used herein is for the purpose of description and not of limitation. Furthermore, although certain methods are described with reference to steps that are presented herein in a certain order, in many instances, these steps may be performed in different order as may be appreciated by one skilled in the art; the method embodiments described are therefore not limited to the particular arrangement of steps disclosed herein.

It is be noted that as used herein and in the appended claims, the singular forms "a", "an", and "the" include plural references unless the context clearly dictates otherwise. Furthermore, the terms "a" (or "an"), "one or more" and "at least one" can be used interchangeably herein. The terms "comprising", "including", "having" and "constructed from" can also be used interchangeably.

Provided here is a capacitor comprising a dielectric of a porous, non-electrically conductive material saturated with a liquid containing dissolved ions. Upon the application of an electric field, ions dissolved in the saturating liquid contained in the pores typically travel toward the ends of pore filling liquid droplets creating giant dipoles. The fields of these giant dipoles oppose the applied field, reducing the net field created per unit of charge on the capacitor plates, effectively increasing charge/voltage ratio, hence capacitance. The maximum voltage such materials can sustain is generally limited by the breakdown voltage of the liquid phase. The dielectric is thus a multi-material mixture comprising both liquid and solid, where the pores of the solid serves as a physical framework holding the polarizable elements in place, and mobile ions in a liquid solution provide the polarizable element.

The capacitor further comprises a first electrode and a second electrode contacting and separated by the dielectric material. Either or both of the first electrode and second electrodes comprise an ionically conducting material such as an oxide where the ionically conducting material has both an ionic and electrical conductivity. The ionically conducting material may comprise substantially all or just a portion of the first electrode, second electrode, or both, and may comprise any weight percent (wt. %) of the first, second, or both electrodes. Additionally, the ionically conducting material may be substantially uniformly dispersed throughout either or both electrodes, may comprise substantially all of the bulk of either or both electrodes, or may generally comprise a generally layer individually present on one or both of the electrodes. In certain embodiments, the first electrode, second electrode, or both comprise an electrically conductive metal, and the ionically conducting material comprises a metal oxide of the electrically conductive metal. In other embodiments, the conducting material is a mixed ionic-electric conductor (MIEC). See e.g. Reiss, "Mixed ionic-electronic conductors—material properties and applications," *Solid State Ionics* 157 (2003), among others.

A particular embodiment of a capacitor 100 is generally illustrated at FIG. 1. Capacitor 100 comprises a first electrode 101 and a second electrode 102 generally comprised of a conductive material possessing both electrical and ionic conductivity. A dielectric material generally indicated by 103 separates first electrode 101 and second electrode 102 by a distance t, with dielectric material 103 comprised of a porous material 104, and pores such as 105 and 106 comprising porous material 104. In certain embodiments, the distance t separating first electrode 101 and second electrode 102 is at least 0.5 μm. Dielectric material 103 further comprises a liquid within the pores, such as liquid 107 within pore 105. Liquid 107 comprises ions, such as the cations + and anions − indicated within pore 105. Typically, porous material 104 contacts first electrode 101 and second electrode 102 and extends across a distance t separating first electrode 101 and second electrode 102. In certain embodiments, capacitor 100 further comprises first current collector 108 in contact with first electrode 101 and second current collector 109 in contact with second electrode 102, where the first and second current collectors comprise an electrically conductive material.

At FIG. 1, ions such as + and − in the liquid within the pores of dielectric material 103 migrate to create dipoles in response to an applied electric field. For example, an electric field E generated from electrode 102 to electrode 101. Generally, the created dipoles have length dependent on a liquid-filled pore diameter. This phenomenology can be manipulated to create a high dielectric material. In each water drop dipoles oppose the applied field E resulting in a decrease in the net field. As more charges are added the dipoles grow larger, hence the net field grows slowly.

The dielectric material 103 of FIG. 1 differs significantly from typical dielectric materials. As is understood, typical dielectric materials generally increase the amount of electric charge stored on a capacitor by lowering the voltage associated with the number of charges. This results from the formation of dipoles in the dielectric that opposes the applied field, thus reducing the net field for any specific charge concentration on the electrode. As capacitance is charge/voltage, the lowering of the voltage for any given number of charges increases capacitance. Typically these dipoles are generally a fraction of an angstrom (Å) in length, meaning longer dipoles would reduce the net field to an even greater extent. In contrast, the dielectric material 103 of capacitor 100 having, for example, pores on the order of 500 Å and filled with liquid 105 comprising cations and anions will have much larger dipoles than found in any solid, and hence will have better dielectrics than any solid or any pure liquid for which the dipole length is no greater than the length of the molecules that compose the liquid.

As discussed, porous material 104 is a material comprising pores and may be any material having a porous structure where ion-containing liquid may reside within a pore volume. In an embodiment, porous material 104 comprises an insulating material having a conductivity less than $10^{-8}$ S/cm. In other embodiments, the insulating material comprises at least 5 wt. %, at least 50 wt. %, at least 70 wt. %, or at least 90 wt. % of porous material 104. As used here, "insulating material" may describe a material of singular composition or a combination of materials having different compositions. In further embodiments, porous material 104 has a conductivity less than $10^{-8}$ S/cm.

Porous material 104 may substantially be an agglomerate comprising consolidated material existing as a relatively rigid, macroscopic body whose dimensions exceed those of the pores by many orders of magnitude. Alternatively, porous material 104 may be an aggregate comprising unconsolidated, nonrigid, loosely packed assemblages of individual particles. Additionally, when such particles are present, the particles themselves may be nonporous and surrounded by a network of interparticle voids, or the particles themselves may be significantly porous and porous material 104 may comprise both internal voids and interparticle voids. Additionally, porous material 104 may comprise a wide distribution of pore sizes, and include micropores (diameter<2 nm), mesopores (2 nm≤diameter≤50 nm), macropores (diameter>50 nm), and combinations thereof. See Aleman et al., "Definitions of Terms Relating to the Structure and Processing of Sols, Gels, Networks, and Inorganic-Organic Hybrid Materials (IUPAC Recommendations 2007)," *Pure Appl. Chem.* 79(10) (2001). In some embodiments, the porous material comprises an insulating material having a conductivity less than $10^{-8}$ S/cm. In some embodiments, the insulating material comprises at least 5 wt. %, at least 50 wt. %, at least 70 wt. %, or at least 90 wt. % of the porous material. As used here, "insulating material" may describe a material of singular composition or a combination of materials having different compositions.

In certain embodiments, porous material 104 has a specific surface area greater than 0.5 m² of surface/gram. In other embodiments when porous material 104 is an aggregate as discussed above, individual particles comprising the aggregate have a specific surface area greater than 0.5 m² of surface/gram. In other embodiments, the pores of porous material 104 have a radius between 1-10,000 Å, and in other embodiments have a mean pore diameter between 1-20,000 Å, and in other embodiments have a mean pore diameter between 1-200,000 Å. In certain embodiments when individual particles comprise an aggregate, the individual particles have a mean pore diameter between 1-200,000 Å. Mean pore diameter may be determined using means known in the art, such as bubble point methods, mercury porosimetry, thermoporometry, permporometry, adsorption/desorption methods, as well as microscopic methods such as scanning electron microscopy, transmission electron microscopy, and others. See e.g., Stanley-Wood et al., Particle Size Analysis (1992), among others. In some embodiments, the mean pore diameter is less than 50% of the distance t separating first electrode 101 and second electrode 102, and in another embodiment, less than 10%, and in a further embodiment, less than 1%. In another embodiment, porous material 104 is a media having a porosity of at least 50%. In some embodiments, porous material 104 comprises an oxide such as alumina, silica, titania, magnesia, and other metal oxides. However, porous material 104 may comprise any material having characteristics as disclosed herein, including fabrics, fibers, sponges, polymer materials such as nylon, and others.

Figure 2:
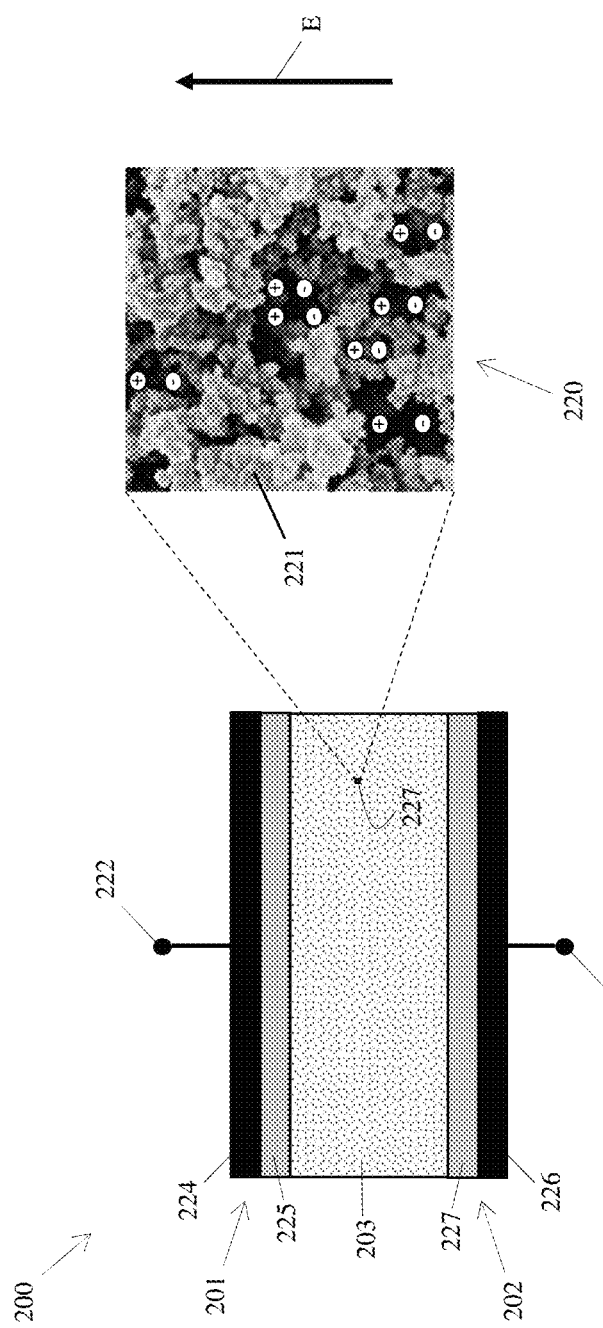
FIG. 2 illustrates another embodiment of the capacitor and dielectric disclosed.

FIG. 2 illustrates a section of another embodiment of a capacitor 200 illustrating a first electrode generally indicated at 201, a second electrode generally indicated at 202, and dielectric material 203. In the particular embodiment illustrated, first electrode 201 comprises a first electrically conductive material 224 and a first ionically conducting material 225, where first ionically conducting material 225 is present as a layer on first electrically conductive material 224 such that first ionically conducting material 225 separates first electrically conducting material 225 and dielectric material 203. First electrically conductive material 224 is electrically conductive and first ionically conducting material 225 comprises an electrically and ionically conductive material. First electrically conductive material 224 may also be an ionic conductor. Similarly, second electrode 201 comprises a second electrically conductive material 226 and a second ionically conducting material 227 present as a layer on second electrically conductive material 226. First electrically conductive material 224 may substantially be compositionally similar or dissimilar to second electrically conductive material 226, and first ionically conducting material 225 may substantially be compositionally similar or dissimilar to second ionically conductive material 227.

FIG. 2 further illustrates a volume 227 of dielectric material 203, shown in expanded view as 220. 220 illustrates a porous material 221 having pores illustrated with the darker areas within 220, and a liquid comprising cations and anions filling the pores of porous material 221. A voltage is applied across electrodes 201 and 202 via leads 222 and 223 respectively, resulting in an electric field E generated from electrode 202 to electrode 201. In response to the electric field E, positive ions + and negative ions − in the liquid within the pores of porous material 222 migrate to create dipoles. Generally, the created dipoles have length dependent on a liquid-filled pore diameter. In each liquid-filled pore volume, dipoles oppose the applied field E resulting in a decrease in the net field. As more charges are added the dipoles grow larger, hence the net field grows slowly. This ion separation greatly increases the effective dielectric constant of the scaffold dielectric located between first capacitor electrode 201 and second capacitor electrode 202, and greatly increases the amount of charge that can be stored in capacitor 200 as compared to conventional capacitors of the same physical size.

The liquid 107 within the pores of porous material 104 may be any liquid comprising ions. In certain embodiments, liquid 107 has an ionic strength of at least 0.1 where the ionic strength is a function of the concentration of all cations and anions present in liquid 107. In some embodiments, the ions comprising liquid 107 comprise cations and anions and the cations have an ionic concentration of at least 0.1 moles per liter of liquid and the anions have an ionic concentration of at least 0.1 moles per liter of liquid. See IUPAC, *Compendium of Chemical Terminology* (the "Gold Book") ($2^{nd}$, 1997). In other embodiments, liquid 107 comprises a solvent and a solute and the solute has a molarity of at least 0.1 moles solute per liter of solvent. In another embodiment, the solute is a polar liquid having a dielectric constant of at least 5, preferably at least 15, and in a further embodiment the solute is a salt, acid, base, or mixtures thereof. Here, "salt" includes nitrates, nitrides, carbides, alkali halides, metal halides and other crystal structures that dissolve in water to create dissolved ions. In certain embodiments, the solvent of liquid 107 is saturated with the solvent to at least a 1% saturation, and in other embodiments at least 10%. In another embodiment, the solvent is water and liquid 107 is an aqueous solution. Additionally, liquid 107 may comprise an organic solvent, containing an electrolyte selected from an acid, a base, and a neutral salt. Also, liquid 107 may be a liquid such as those found in acid or base solutions, salt solutions, other electrolytic solutions or ionic liquids of any kind. As disclosed herein, the liquid comprising ions may be any liquid or mixture of liquids, solvents, solutes and the like which provide ions in a liquid as described. See e.g. Gandy et al., "Testing the Tube Super Dielectric Material Hypothesis: Increased Energy Density Using NaCl," *J. Electron. Mater.* 45 (2016); see also Quintero et al., "Tube-Super Dielectric Materials: Electrostatic Capacitors with Energy Density Greater than 200 J·cm−3," *Materials* 8 (2015); see also Fromille et al., "Super Dielectric Materials," *Materials* 7 (2014); see also Quintero et al., "Super Dielectrics Composed of NaCl and $H_2O$ and Porous Alumina," *J. Electron. Mater.* 44 (2015); see also Jenkins et al., "Investigation of Fumed Aqueous NaCl Superdielectric Material," *Materials* 9 (2016); see also Phillips et al., "Novel Superdielectric Materials: Aqueous Salt Solution Saturated Fabric," *Materials* 9 (2016); see also U.S. Pat. No. 9,530,574 issued to Phillips et al., issued Dec. 27, 2016; see also U.S. patent application Ser. No. 15/239,039 filed by Phillips et al., filed Aug. 17, 2016; see also U.S. patent application Ser. No. 15/620,983 filed by Phillips et al., filed Jun. 13, 2017; see also U.S. patent application Ser. No. 15/788,280 filed by Phillips et al., filed Oct. 19, 2017; see also U.S. Pat. No. 9,711,293 issued to Phillips, issued Jul. 18, 2017.

Liquid 107 may be located in the pores of porous material 104 using any means known in the art. In certain embodiments, porous material 104 and liquid 107 may be mixed by hand or otherwise to create a spreadable paste with little to substantially no free water (incipient wetness). "Paste" as used herein refers to a thick, soft moist substance, having little to substantially no free water. However, other methodologies may be employed as known in the art, including incipient wetness impregnation, direct immersion, capillary impregnation, diffusional impregnation, pressure or vacuum impregnation, and others.

As discussed, either or both of the first electrode and second electrode comprise an ionically conducting material having both an ionic and electrical conductivity. The ionically conducting material may comprise substantially all or just a portion of an individual electrode, and may comprise any weight percent (wt. %) of the individual electrode. In some embodiments, the ionically conducting material comprises at least 0.5 wt. %, at least 5 wt. %, at least 50 wt. %, at least 70 wt. %, or at least 90 wt. % of the individual electrode. In a particular embodiment, the ionically conducting material comprises an oxide of an electrically conducting material comprising the individual electrode. For example, the individual electrode might comprise an electrically conducting material of lead (Pb) and further comprise an ionically conducting material comprising a lead oxide $Pb_aO_b$. As used here and elsewhere, "oxide" means an metal oxide having the elemental composition $M_aO_b$ where M is at least a first element and O is an oxygen anion, and where the oxide may be a stoichiometric oxide with M and O combined in a definite proportion or may be a non-stoichiometric oxide with M and O not combined in a definite proportion. In another embodiment, the oxide has an elemental composition $M_cO_{(d-x)}$ where M is at least the first element, O is the oxygen anion, c and d are natural numbers, and x is a number greater than 0.001.

As is understood, the ionically conducting material having both an ionic and electrical conductivity typically utilizes electrically charged particles that include both ions and electrons. As used here, "ionically conducting material" means a material which conducts both ions ($\sigma_i$) and electronic ($\sigma_{el}$) charge carriers. The ionic charge carriers generally comprise cations, anions, and foreign ions such as impurity ions, dopant ions and protons, and the electronic charge carriers are the electrons and electron holes. Generally, when the ionically conducting material is an oxide, the concentrations of the charge carriers are directly related to the defect structure of the oxide. Further, some ionic and electrical conductors are or may become ionic conductors or mixed ionic/electronic conductors depending on a prevailing temperature and/or surrounding atmospheric condition, such as an oxygen pressure. The total conductivity of materials serving as both ionic and electrical conductors may be expressed as $\sigma=\sigma_{ion}+\sigma_{el}=\sigma_c+\sigma_a+\sigma_n+\sigma_p$, where $\sigma_e$, $\sigma_a$, $\sigma_n$, and $\sigma_p$ are the cation, anion, electron, and electron hole conductivities respectively. The ionically conducting materials utilized in this disclosure may have any quantitative relationship between the ionic conduction $\sigma_{ion}$ and the electronic conduction $\sigma_{el}$, provided that the conducting materials possess both an ionic and electrical conductivity. In some embodiments, the ionic conduction $\sigma_{ion}$ and the electronic conduction $\sigma_{el}$ are within two orders of magnitude such that $0.01 \leq |\sigma_{ion}/\sigma_{el}| \leq 100$. In some embodiments, the ionic conduction $\sigma_{ion}$ is greater than or equal to $10^{-9}$ S/cm, in other embodiments greater than or equal to $10^{-8}$ S/cm, and in other embodiments greater than or equal to $10^{-7}$ S/cm. In other embodiments, both the ionic conduction $\sigma_{ion}$ and electrical conduction $\sigma_{el}$, is greater than or equal to $10^{-5}$ S/cm. Electrical and ionic conductivities may be determined using means known in the art, such as impedance spectroscopy. See e.g. Wang et al., "Electrical and Ionic Conductivity of Gd-Doped Ceria," *Journal of The Electrochemical Society*, 147 (10) (2000); see also Sheltzline et al., "Quantifying Electronic and Ionic Conductivity Contributions in Carbon/Polyelectrolyte Composite Thin Films," *Journal of The Electrochemical Society*, 161 (14) (2014); see also Wang et al., "Electrochemical Impedance Spectroscopy (EIS) Study of $LiNi_{1/3}Co_{1/3}Mn_{1/3}O_2$ for Li-ion Batteries," *Int. J. Electrochem. Sci.* 7 (2012), among others. Additionally, as used here, "ionically conductive material" may describe a material of singular composition or a combination of materials having different compositions.

Further and as discussed, the individual electrode comprising capacitor 100 further comprises a electrically conductive material. In typical embodiments, the electrically conducting material has an electrical conductivity greater than $10^3$ S/cm. In some embodiments, the electrically conductive material comprises at least 0.5 wt. %, at least 5 wt. %, at least 50 wt. %, at least 70 wt. %, or at least 90 wt. % of the individual electrode. As used here, "electrically conductive material" may describe a material of singular composition or a combination of materials having different compositions. In further embodiments, an electrode such as first electrode 101, second electrode 102, or both have a conductivity greater than $10^3$ S/cm.

As disclosed, capacitor 100 differs significantly from typical devices utilizing liquids as energy storage or delivery components. For example, unlike electrolytic capacitors and among other distinctions, capacitor 100 utilizes an ionic solution in contact with both first electrode 101 and second electrode 102. Similarly, unlike a high specific surface area EDLC, capacitor 100 generally relies on large induced electric dipoles formed within liquid 107 residing within the longitudinal channels in order to enable maximum energy densities and dielectric values, as opposed to separation of charge in a Helmholtz double layer at an electrode/electrolyte interface. In certain embodiments, capacitor 100 also has a substantial absence of electrochemical activity among the ions of liquid 107, first electrode 101, and second electrode 102, and differs significantly from devices that rely on redox or other electrochemical activity between an electrolyte and electrode. In a specific embodiment, the redox potentials among the components are sufficiently similar such that first electrode 101 has a first redox potential $E_1^0$ under standard conditions, the positive ion of liquid 107 has a positive ion redox potential $E_+^0$ under standard conditions, and the negative ion of liquid 107 has a negative ion redox potential $E_-^0$ under standard conditions, and an absolute value of $E_+^0$ divided by $E_1^0$ is greater than 0.9, in some embodiments greater than 0.95, and in other embodiments greater than 0.99. In other embodiments, second electrode 102 has a second redox potential $E_2^0$ under standard conditions, and an absolute value of $E_+^0$ divided by $E_2^0$ is greater than 0.9, in some embodiments greater than 0.95, and in other embodiments greater than 0.99. In other embodiments, an absolute value of $E_-^0$ divided by $E_1^0$ is greater than 0.9, in some embodiments greater than 0.95, and in other embodiments greater than 0.99, and in other embodiments, an absolute value of $E_-^0$ divided by $E_2^0$ is greater than 0.9, in some embodiments greater than 0.95, and in other embodiments greater than 0.99. Capacitor 100 also generally experiences an absence of positive or negative ions undergoing reversible inclusions into electrode materials through intercalaction/deintercalation processes. In certain embodiments, the positive ions and negative ions of liquid 107 are not ions of an atom or molecule comprising the first conductive material comprising first electrode 101, and in other embodiments, the positive ions and negative ions of liquid 107 are not ions of an atom or molecule comprising the second conductive material comprising second electrode 102. In some embodiments, the same electrically conducting material and ionically conducting material is used for both electrodes and, at all stages of charge and discharge, the electrodes remain substantially identical to each other.

The disclosure further provides a method of supplying power to a load using the capacitor disclosed. The method comprises applying a first voltage to a first electrode and a second voltage to a second electrode, where a dielectric contacts the first electrode and the second electrode, where the dielectric comprises a porous material and further comprises a liquid within the pores of the porous material, where the liquid comprises cations and anions, and where a difference between the second voltage and the first voltage is less than a breakdown voltage of a liquid comprising a dielectric, and migrating the cations and anions within the pores of the porous materials, thereby generating a charged capacitor. The method further comprises electrically connecting the charged capacitor to the load and discharging the charged capacitor to the load, thereby supplying power to the load. Here and elsewhere and as is understood, "breakdown voltage" means the minimum voltage or potential difference between two ends of a substance required to cause an electric breakdown such that electron flow will occur. See e.g. Herbert, J. M., *Ceramic Dielectrics and Capacitors*, Vol. 6 (1992), among many others.

Additionally described herein is method of making a capacitor comprising the steps of mixing a porous material comprising pores with a liquid comprising ions into a paste and driving the liquid comprising ions into the pores comprising the porous material, where the liquid comprising ions has an ionic strength of at least 0.1, and where the porous material comprises an insulating material having a conductivity less than $10^{-8}$ S/cm, thereby forming the dielectric material; applying the dielectric material to a first electrode comprising a first electrically conducting material and a first ionically conducting material to establish contact between the dielectric material and the first electrode, and contacting the dielectric material and a second electrode comprising a second electrically conducting material and a second ionically conducting material, where the second electrode contacts the dielectric material such that the dielectric material separates the first electrode, thereby making the capacitor.

Thus, described herein is a capacitor comprising a first electrode and a second electrode where the first electrode and the second electrode comprise a ionically conductive material typically having both an electrical and ionic conductivity, such as an oxide, and further includes a dielectric material contacting the first and second electrode, where the dielectric material has a dielectric constant greater than $10^5$. The dielectric material comprises a porous material having a surface area greater than 0.5 m² of surface/gm of material and further comprises a liquid containing ions within the pores of the porous material. In certain embodiments, the capacitor additionally comprises a first current collector in contact with the first electrode and a second current collector is contact with the second electrode, where the first and second current collector comprise an electrically conductive material.

Accordingly, this description provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A capacitor comprising:
   a first electrode comprising an electrically conducting material and an ionically conducting material;
   a second electrode;
   a dielectric paste having incipient wetness and separating the first electrode and the second electrode, the dielectric paste comprising:
      a porous material comprising pores, where the porous material contacts the first electrode and the second electrode; and
      a liquid comprising ions within the pores of the porous material, wherein the liquid is mixed into the porous material to form the dielectric paste;
   an applied electric field generated from the first electrode to the second electrode; and
   induced electric dipoles formed in the liquid in the pores, wherein the induced electric dipoles oppose the applied electric field to reduce a net field created per unit of charge on the first and second electrodes.

2. The capacitor of claim 1 where the liquid comprises a solvent and a solute and where the solute has a molarity of at least 0.1 moles solute per liter of solvent.

3. The capacitor of claim 2 where the solvent is a polar liquid.

4. The capacitor of claim 3 where the polar liquid has a dielectric constant of at least 5.

5. The capacitor of claim 4 where the solute is a salt, an acid, or a base.

6. The capacitor of claim 5 where the solute is selected from the group consisting of boric acid, potassium hydroxide, sodium chloride, or mixtures thereof.

7. The capacitor of claim 1 where the ionically conducting material has an ionic conductivity of greater than or equal to $10^{-9}$ S/cm.

8. The capacitor of claim 1 where the liquid has an ionic strength of at least 0.1.

9. The capacitor of claim 8 where the ions comprise cations and anions and where the cations have an ionic concentration of at least 0.1 moles per liter of liquid and where the anions have an ionic concentration of at least 0.1 moles per liter of liquid.

10. The capacitor of claim 1 where the porous material has a having a surface area greater than 0.5 m² of surface/gm of material.

11. The capacitor of claim 10 where the electrically conducting material has a conductivity greater than $10^3$ S/cm, and where the porous material comprises an insulating material having a conductivity less than $10^{-8}$ S/cm.

12. The capacitor of claim 11 where the first electrode and the second electrode are separated by a thickness t from the first electrode to the second electrode, and where the pores comprising the porous material have a mean pore diameter of less than 10% of the thickness t.

13. The capacitor of claim 12 where the mean pore diameter is greater than or equal to 1 Å and less than or equal to 200,000 Å.

14. The capacitor of claim 12 where porous material comprises a plurality of particles where each particle in the plurality has a mean pore diameter is greater than or equal to 1 Å and less than or equal to 200,000 Å.

15. A method of supplying power to a load using the capacitor of claim 1 comprising
applying a first voltage to the first electrode and a second voltage to the second electrode, where a difference between the second voltage and the first voltage is less than a breakdown voltage of the liquid comprising ions within the pores of the porous material of the dielectric material;
migrating cations comprising the liquid and anions comprising the liquid within the pores of the porous material and forming dipoles within the pores of the porous material, thereby generating a charged capacitor; and
electrically connecting the charged capacitor to the load and discharging the charged capacitor to the load, thereby supplying power to the load.

16. A method of making the capacitor of claim 1 comprising:
mixing the porous material comprising pores with the liquid comprising ions into the dielectric paste and driving the liquid comprising ions into the pores comprising the porous material, where the liquid comprising ions has an ionic strength of at least 0.1, and where the porous material comprises an insulating material having a conductivity less than $10^{-8}$ S/cm, and where the dielectric paste comprises the porous material and the liquid containing ions, thereby forming the dielectric material;
applying the dielectric material to the first electrode and establishing contact between the dielectric material and the first electrode, where the first electrode comprises a first conductive material having a conductivity greater than $10^3$ S/cm; and
placing the second electrode on the dielectric material at a location such that the dielectric material separates the first electrode and the second electrode, where the second electrode comprises a second conductive material having a conductivity greater than $10^3$ S/cm, thereby establishing contact between the dielectric material and the second electrode and thereby separating the first electrode and the second electrode with the dielectric material, thereby making the capacitor.

17. A capacitor comprising:
a first electrode comprising a first electrically conducting material and a first ionically conducting material, where the first electrically conducting material has an electrical conductivity greater than $10^3$ S/cm;
a second electrode comprising a second electrically conducting material and a second ionically conducting material, where the second electrically conducting material has an electrical conductivity greater than $10^3$ S/cm;
a dielectric paste having incipient wetness and separating the first electrode and the second electrode, the dielectric comprising:
a porous material comprising pores, where the porous material comprises an insulating material having a conductivity less than $10^{-8}$ S/cm, and where the porous material contacts the first electrode and the second electrode; and
a liquid comprising ions within the pores of the porous material where the liquid has an ionic strength of at least 0.1, and wherein the liquid is mixed into the porous material to form the dielectric paste;
an applied electric field generated from the first electrode to the second electrode; and
induced electric dipoles formed in the liquid in the pores, wherein the induced electric dipoles oppose the applied electric field to reduce a net field created per unit of charge on the first and second electrodes.

18. The capacitor of claim 17 where the first electrode and the second electrode are separated by a thickness t from the first electrode to the second electrode, and where the pores comprising the porous material have a mean pore diameter of less than 10% of the thickness t.

19. The capacitor of claim 18 where the ions comprise cations and anions and where the cations have an ionic concentration of at least 0.1 moles per liter of liquid and where the anions have an ionic concentration of at least 0.1 moles per liter of liquid.

20. The capacitor of claim 19 where the mean pore diameter is greater than or equal to 1 Å and less than or equal to 200,000 Å.

* * * * *